United States Patent
Bernardelle et al.

(10) Patent No.: US 6,823,766 B2
(45) Date of Patent: Nov. 30, 2004

(54) METHOD AND MACHINE FOR STRIPPING ELECTRIC CABLES

(75) Inventors: Roberto Bernardelle, San Vito di Leguzzano (IT); Valentino Marchioro, Malo (IT); Mario Casella, Schio (IT)

(73) Assignee: Samec Divisione Costruzione Macchine SRL, Schio (IT)

( * ) Notice: Subject to any disclaimer, the term of this patent is extended or adjusted under 35 U.S.C. 154(b) by 72 days.

(21) Appl. No.: 10/140,947

(22) Filed: May 9, 2002

(65) Prior Publication Data

US 2002/0174759 A1 Nov. 28, 2002

(30) Foreign Application Priority Data

May 23, 2001 (IT) ........................................ VI2001A0118

(51) Int. Cl.[7] .............................................. B23P 19/00
(52) U.S. Cl. .......................... 83/880; 83/974; 81/9.4; 29/33 M; 29/240; 29/748
(58) Field of Search ......................... 83/459, 861, 947, 83/880, 883, 924, 51, 879, 623, 155, 444, 694; 29/564.4, 426.4, 825, 828, 866, 867, 747, 748, 240, 745; 81/9.51, 9.4, 9.41, 9.42; 140/1, 149; 30/91.1

(56) References Cited

U.S. PATENT DOCUMENTS

| | | | | |
|---|---|---|---|---|
| 2,884,825 A | * | 5/1959 | Eubanks | 81/9.51 |
| 4,009,738 A | | 3/1977 | Baba et al. | 140/149 |
| 4,117,749 A | * | 10/1978 | Economu | 30/90.6 |
| 4,594,921 A | * | 6/1986 | Ishmael | 81/9.4 |
| 4,802,512 A | * | 2/1989 | Kodera | 140/149 |
| 4,942,789 A | * | 7/1990 | Hoffa et al. | 81/9.51 |
| 5,062,192 A | * | 11/1991 | Sawyer et al. | 29/426.4 |
| 5,085,114 A | * | 2/1992 | DeRoss et al. | 83/861 |
| 5,375,485 A | * | 12/1994 | Hoffa | 81/9.51 |
| 5,445,051 A | | 8/1995 | Carpenter et al. | 81/9.51 |
| 5,539,967 A | * | 7/1996 | Nazerian et al. | 29/33 M |
| 5,561,899 A | * | 10/1996 | Carpenter et al. | 29/825 |
| 5,787,768 A | * | 8/1998 | Talley | 81/9.51 |
| 6,336,267 B1 | * | 1/2002 | Hoffa | 29/745 |

FOREIGN PATENT DOCUMENTS

IT 1174970 * 7/2001 ............ H02G/1/12

* cited by examiner

Primary Examiner—Allan N. Shoap
Assistant Examiner—Ghassem Alie
(74) Attorney, Agent, or Firm—Dykema Gossett PLLC (57) ABSTRACT

A method of stripping electric cables (C) is disclosed comprising the following steps: arranging the end (E1, E2) of a cable (C) to be stripped inside a stripping unit (1); cutting circumferentially the sheath (C1, C2) covering the end (E1, E2) of the cable (C) for at least a portion of the thickness and at least a portion of the perimeter of the sheath (C1, C2); separating the sheath (C1, C2) covering the end (E1, E2) of the cable (C). The circumferential cut of the sheath (C1, C2) is carried out by combining an action of incision of the sheath (C1, C2) with an action of rotation of the cable (C).

14 Claims, 14 Drawing Sheets

METHOD AND MACHINE FOR STRIPPING ELECTRIC CABLES

The present invention relates to a method for stripping electric cables and a stripping machine to carry out said method. It is well known that proper stripping machines are used to strip the ends of electric cables, carrying out such stripping operation in an automatic or semiautomatic way.

The known stripping machines available on the market are provided with blades with cutting profile put in motion by suitable driving means moving the blades one against the other and the cable arranged therebetween along a rectilinear direction orthogonal to the cable advancement direction.

In order to carry out the stripping operation, the blades are lowered until they incise the sheath of the cable that is then advanced along the longitudinal direction defined by its axes.

In this way the blades that are not yet inserted in the incision made in the sheath, act as resistant element and when the cable is advanced they allow to unthread the sheath cut section.

The above mentioned machines of the prior art have however some drawbacks.

A first drawback consists in that when the cutting profile of the blades is worn, a neat incision of the sheath cannot be obtained and its separation from the cable may result difficult.

This happens especially in the stripping machines carrying out also shearing of the cables by using for the shearing operation the same blades that are used for the stripping operation.

Another drawback consists in that if work is effected with blades having a worn cutting edge, during incision the cable may be squeezed and therefore damaged especially when the cables are of soft material and of small thickness.

The present invention aims at overcoming said drawbacks.

More particularly, a first object of the invention is to provide a method to carry out stripping of electric cables allowing to improve the quality of the sheath incision.

Another object of the method of the invention is to obtain a good incision of the sheath even using blades with imperfectly sharpened cutting edges.

A further object of the method of the invention is to obtain an optimal incision of the sheath even on cables made of soft materials and of small thickness.

A last but not least object of the invention is to provide a machine allowing to carry out the above mentioned stripping method.

The foregoing objects are attained by a stripping method for electric cables that according to the main claim comprises the following steps: arranging the end of at least a cable to be stripped inside a stripping unit; cutting circumferentially the sheath covering said end of said cable for at least a portion of the thickness and at least a portion of the perimeter of said sheath; separating said sheath covering said end from said cable, and wherein said circumferential cut of said sheath is carried out combining at least an action of incision of said sheath with at least an action of rotation of said cable.

According to a first operative mode, the circumferential cut of said sheath comprises sequentially: a first incision of said sheath; a rotation of said cable; a second incision of said sheath, where the action of rotation of said cable starts when the first incision is ended and ends before starting the second incision.

According to a second operative mode, the circumferential cut of said sheath starts before the rotation action and is continued during the rotation action.

According to the invention the above mentioned method is carried out by a stripping machine for electric cables comprising a casing on which there are a stripping unit for said cable; driving means for advancing said cable arranged upstream and downstream said stripping unit; at least a control and actuation microprocessor unit, and wherein said stripping unit comprises at least a cutting unit for incision of the sheath covering at least an end of said cable; at least a rotation unit receiving said cable and putting it in rotation around the longitudinal axis defined by said cable when it is arranged in a rectilinear position.

According to the embodiment that will be described hereinafter, the rotation unit comprises a cable blocking chuck arranged coaxially outside said cable and coupled to driving means putting it in rotation around the longitudinal axis defined by the cable when it is arranged in a rectilinear position.

The blocking chuck comprises in its turn a couple of opposite jaws coupled to driving means adapted to move them mutually one against the other to clamp the cable to be stripped therebetween.

The driving means to put in rotation said rotation unit as well as the driving means to move said jaws, consist of fluidic actuators preferably but not necessarily pneumatic actuators.

Advantageously, use of the method of the invention and of the stripping machine with stripping unit provided with rotary chuck, allow to improve the cutting and stripping quality of cables of any kind.

Still advantageously, the stripping unit with rotary chuck may be applied to stripping machines of any kind and therefore, for instance, to machines that carry out in addition to the cable stripping operation, also the shearing operation of the cable to obtain sections of predetermined length and possibly also stripping of the wires constituting the cable.

The foregoing objects and advantages will be better understood by reading the following description of a preferred embodiment of the method of the invention and of the stripping unit to carry out the method, by making reference to the accompanying sheets of drawing in which.

Figure 1:
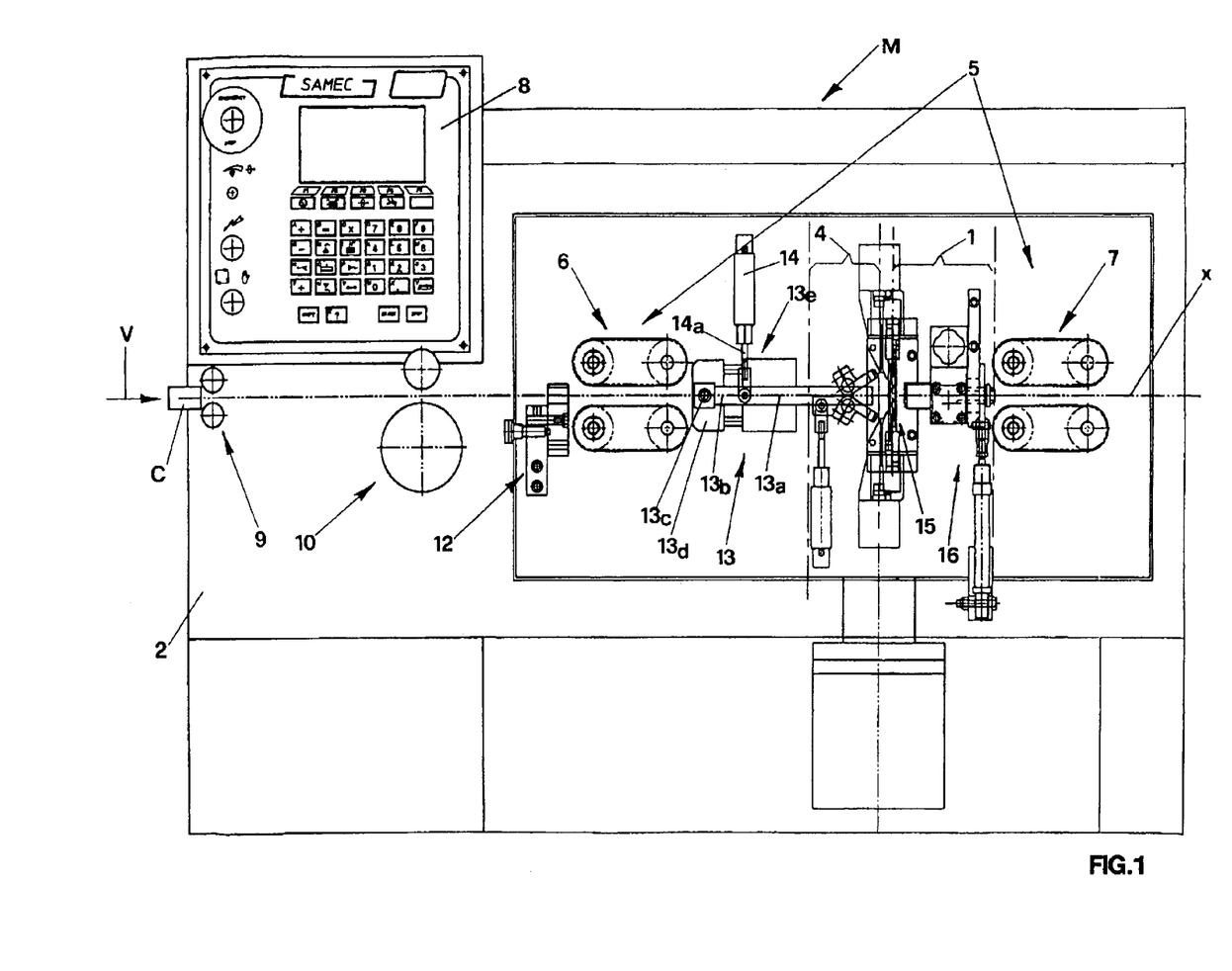
FIG. 1 is a general front view of the stripping machine of the invention.

The machine of the invention is a shearing-stripping machine shown in FIG. 1 where it is indicated generally with character M and is provided with a stripping unit generally indicated with reference numeral 1.

Figure 2:
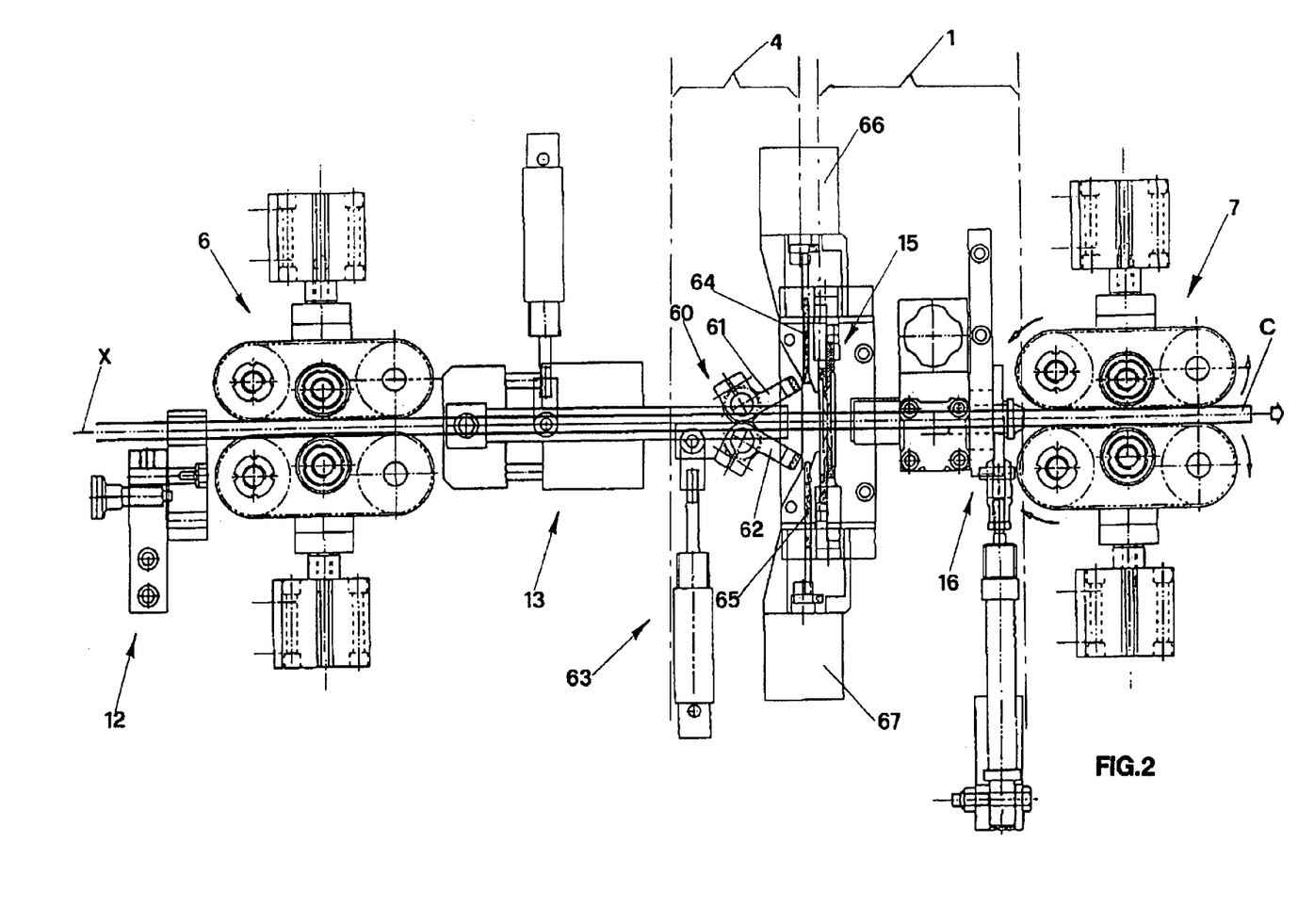
FIG. 2 shows a portion of the machine of FIG. 1.

The machine comprises a casing 2 supporting the stripping unit 1 to be generally seen also in FIG. 2; driving means generally indicated with numeral 5 that can be seen besides FIGS. 1 and 2 also in FIGS. 10 to 15, adapted to advance the cable C along a longitudinal direction X; and a control and actuation microprocessor unit generally indicated with numeral 8.

Figures 16, 16A:
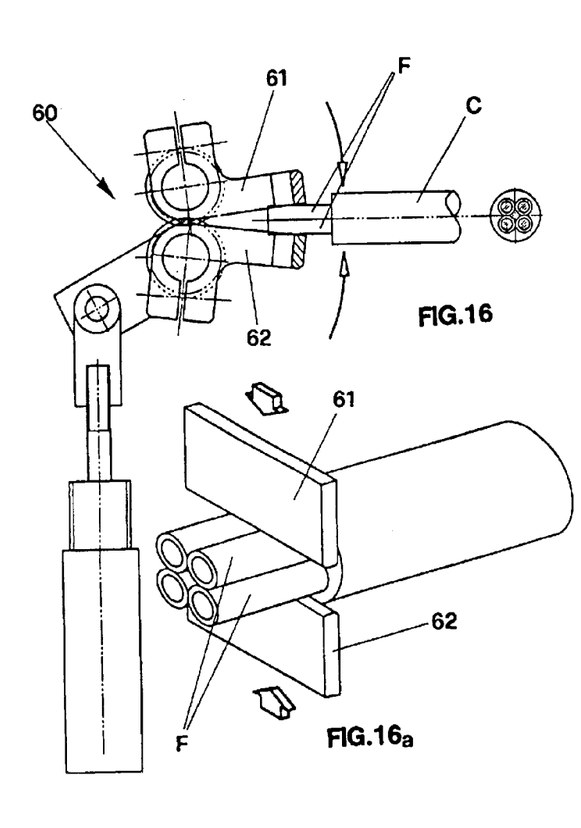
FIGS. 16a and 17a show further details of the arrangement of FIG. 15.
FIGS. 16 and 17 show details of FIG. 15.
Figures 17, 17A:
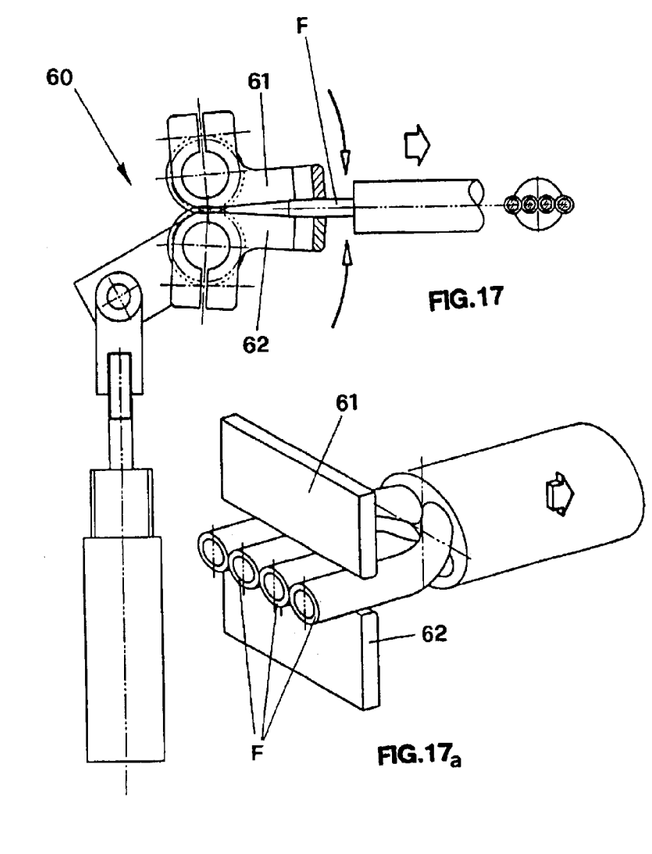

Preferably but not necessarily the shearing-stripping machine of the invention is also provided with an alignment and stripping unit generally indicated with numeral 4 for the wires F constituting the cable C, shown in detail in FIGS. 16 and 17.

With particular reference to FIG. 2, one can see that the driving means 5 comprise a first driving unit generally indicated with numeral 6, introducing the cable C to the stripping unit 1 and a second driving unit generally indicated with numeral 7, extracting said cable C from the stripping unit 1.

The shearing-stripping machine M comprises also a cable guide roller inlet 9 followed by a gauging unit 10 and a cable guiding inlet 12 enhancing grip of cable C by the first driving unit 6.

Downstream the first driving unit 6 there is an intermediate cable guide 13 comprising a tubular member 13a having an end 13b pivoted though a pin 13c to the movable member 13d of a first actuator 13e fixed to the casing 2 of the machine; a second actuator 14 also fixed to the casing 2 of the machine, having the movable member 14a pivoted in an intermediate position to the tubular member 13a.

Through said actuators, the tubular member 13a therefore may be translated horizontally and rotated around the pin 13c.

According to the invention the stripping unit 1 comprises a cutting unit 15 for incision of said sheath covering at least an end E1, E2 of said cable C; a rotation unit 16 receiving said at least an end E1, E2 of said cable C and putting it into rotation around the longitudinal axis X that said cable C defines when it is arranged in a rectilinear position.

Figures 7, 8, 9:
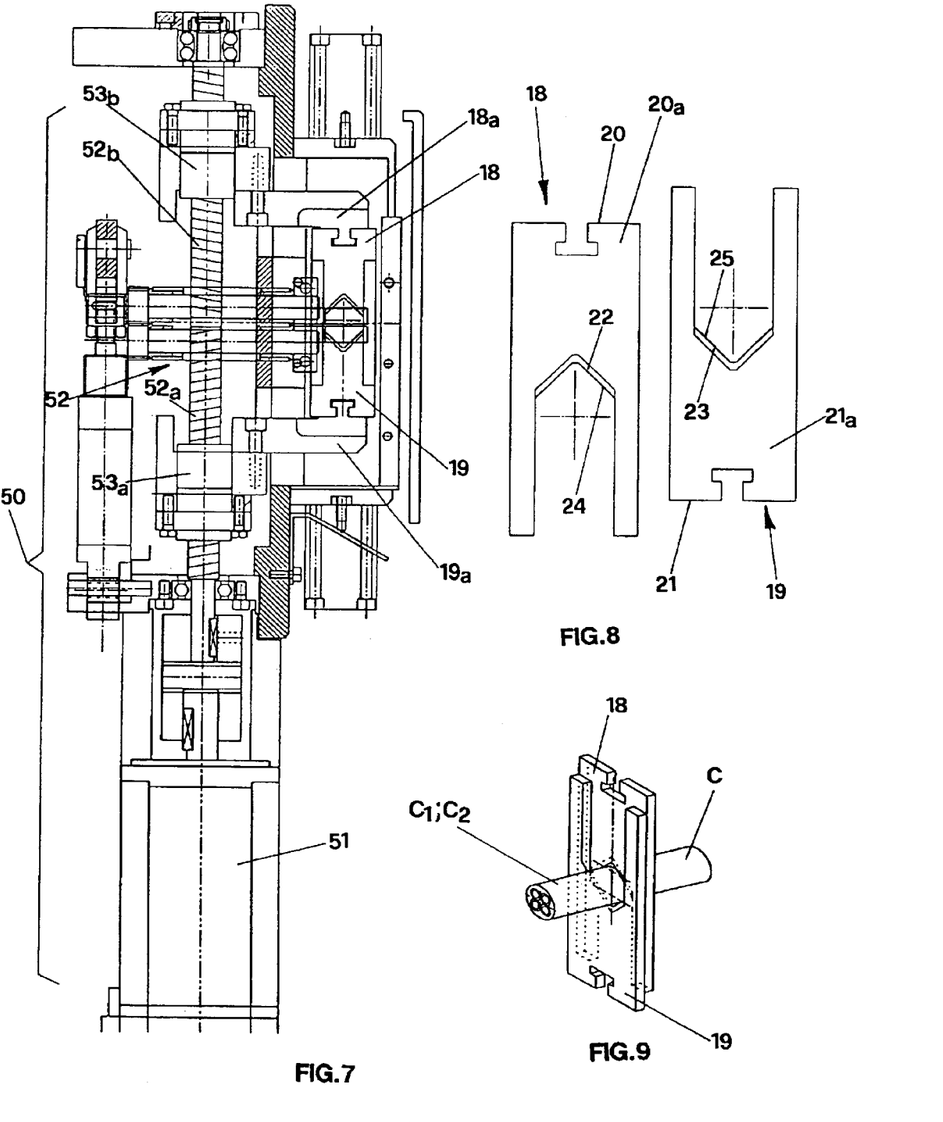

As to the cutting unit 15, one can see in FIG. 2 that it comprises first blades 18, 19 to be seen in detail in FIGS. 8 and 9 and comprising a couple of plates 20, 21 with planar surfaces 20, 21a juxtaposed one close to the other, each plate being provided with cutting edges 22, 23 having a V shaped profile with sharp edge 24, 25.

It is to be pointed out that the first blades may have also a shape different from that described and illustrated in the drawings.

The cutting unit 15 comprises also first driving and moving means 50 to be seen in FIG. 7 adapted to move said blades 18, 19 in opposite vertical directions relative to the cable C arranged therebetween.

More particularly the driving and moving means 50 comprise a motor 51 putting in rotation a nut screw 52 having right-hand and left-hand threads 52a and 52b respectively, connected to corresponding nut screws 53a and 53b that through blade holders 18a, 19a support the first blades 18 and 19 respectively. In this way, rotation of the motor 51 moves the first blades 18 and 19 to or away one another and the cable C whether the rotation occurs clockwise or anti-clockwise.

The rotation unit generally indicated with numeral 16 shown in FIG. 2 and in detail in FIGS. 3 to 6, comprises a rotary chuck generally indicated with 30, whose body 30a is supported by a flange 31 connected to an actuator 32.

The actuator 32 has the body 32a pivoted to the casing 2 of the machine while its rod 32b has the end pivoted to said flange 31 so that movement of the rod 32b generates rotation of the rotary chuck 30.

This chuck, more particularly, comprises a couple of jaws 33, 34 between which the cable C is blocked, each jaw being supported by a slide, a second slide 35 and a first slide 36 respectively, sliding in the body 30a of the chuck and provided with a rack 37, 38.

Figure 6:
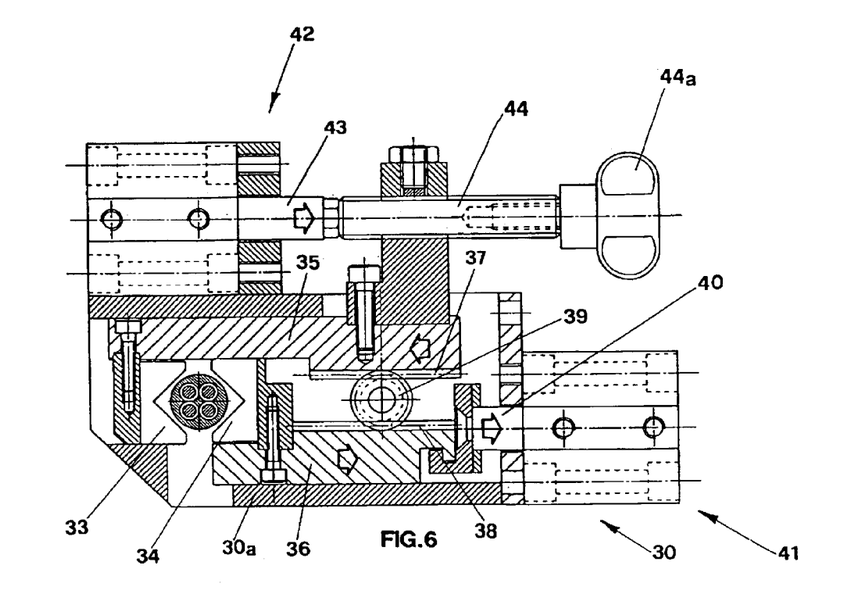
Figure 6A:
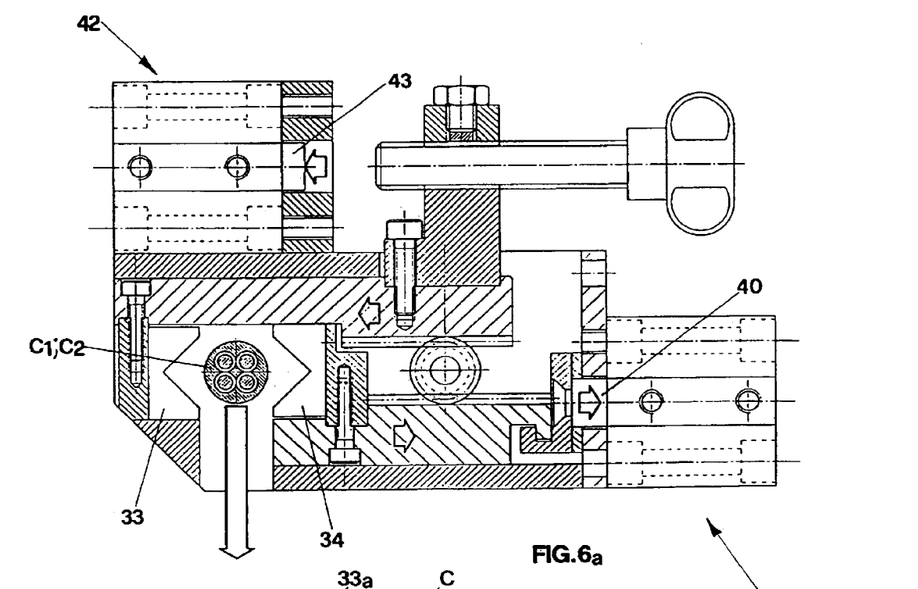
Figures 6B, 6C:
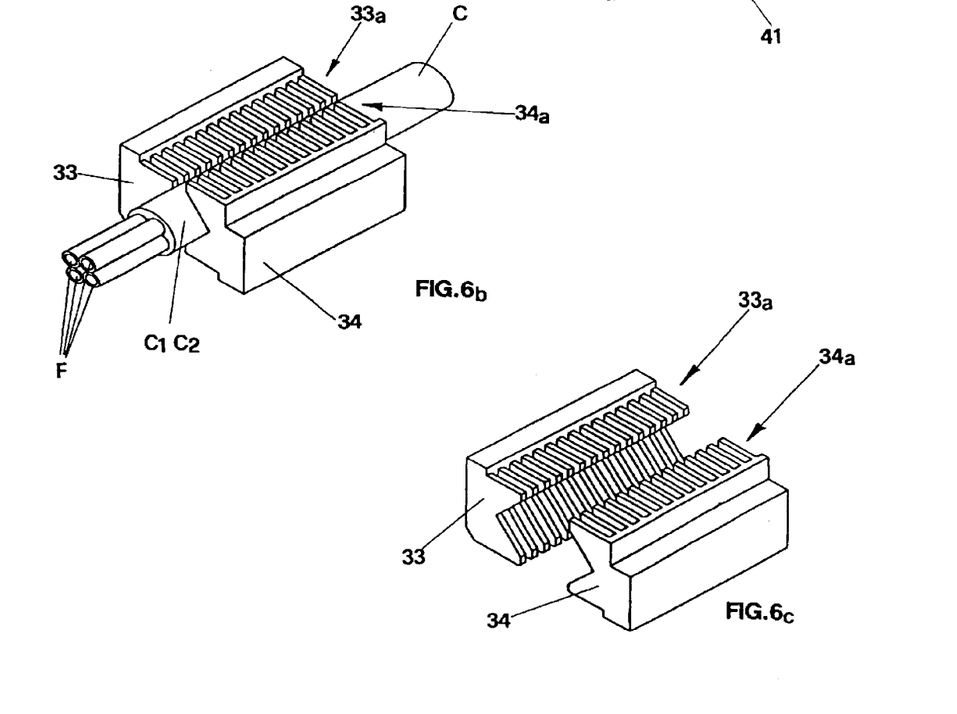

The racks 37 and 38 are facing each other and mesh with a pinion gear 39 while as shown in FIGS. 6b and 6c, the jaws 33, 34 have a profile in the form of a V shaped like a comb 33a, 34a for a better adhesion to the cable C.

One of the slides, more particularly the first slide 36, is connected to the rod 40 of a first pneumatic actuator 41 and when the actuator 41 is fed with pressurized air, the movement of its rod 40 causes the mutual movement of the jaws 33, 34 to and away each other and therefore blocking or release of the cable C whether the movement of the rod 40 is in the direction of the arrow 40a or in the opposite direction of the arrow 40b.

Indeed, interposition of the pinion gear 39 between the racks 37, 38 allows to obtain always opposed movement of the jaws 33, 34.

A second actuator generally indicated with numeral 42 and supported by the body 30a of the rotary chuck 30, has also a rod 43 co-operating with a screw 44 coupled in a nut screw 45 fixed to the second slide 35.

The screw 44 can be manually manipulated by the operator through a handle 44a and adjusting the contrast against the rod 43 of the second actuator 42 it is possible to adjust the opening position of the jaws 33, 34 at will of the user.

As already mentioned, part of the shearing-stripping machine M of the invention is preferably but not necessarily also an alignment unit for the wires F constituting the cable C, generally indicated with numeral 4 and arranged upstream the stripping unit 1 as shown in FIG. 1 and also in FIG. 2.

Figure 15:
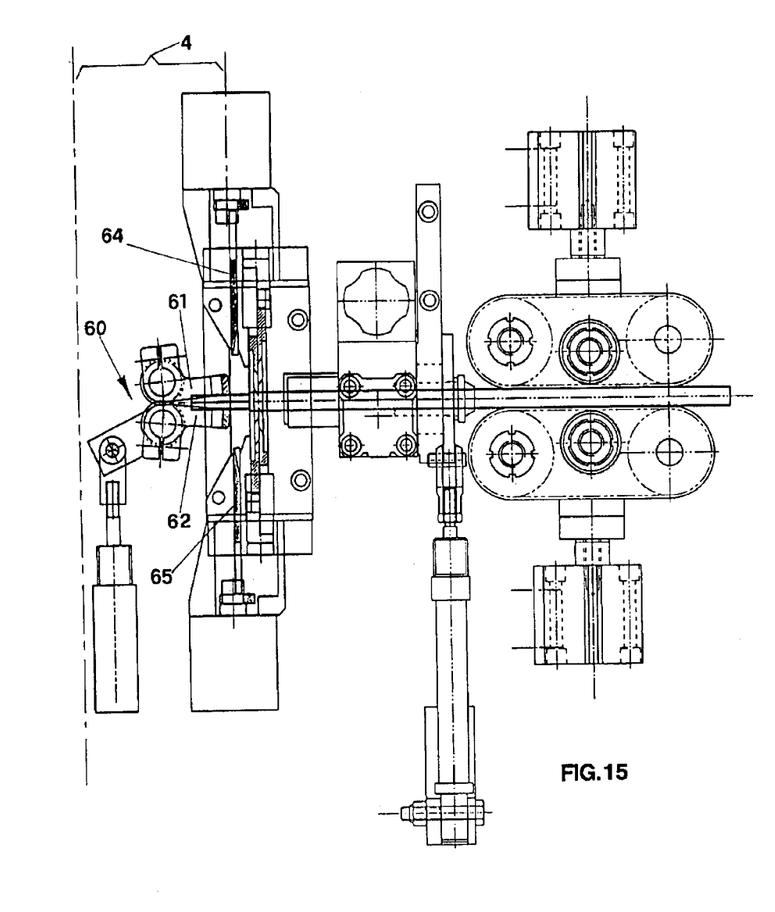

The alignment unit 4 is adapted to arrange the wires F of the cable C aligned on a generally horizontal plane juxtaposed one to the other before their stripping as shown in FIGS. 15 to 17.

More particularly, the alignment and stripping unit 4 according to a preferred embodiment comprises a couple of aligning jaws generally indicated with 60 and consisting of two opposed jaws 61, 62 actuated by an actuator 63 and a couple of second opposed stripping blades 64, 65 that are moved one against the other by actuators 66, 67 respectively.

To proceed to strip the cable C, the method of the invention provides for the following steps: arranging the end of the cable C to be stripped inside the stripping unit 1; cutting circumferentially the sheath covering said end of said cable C for at least a portion of the thickness and at least a portion of the perimeter of said sheath; separating said sheath covering said end from said cable where the circumferential cut of said sheath is carried out combining at least an action of incision of the sheath with at least an action of rotation of the cable.

Figure 10:
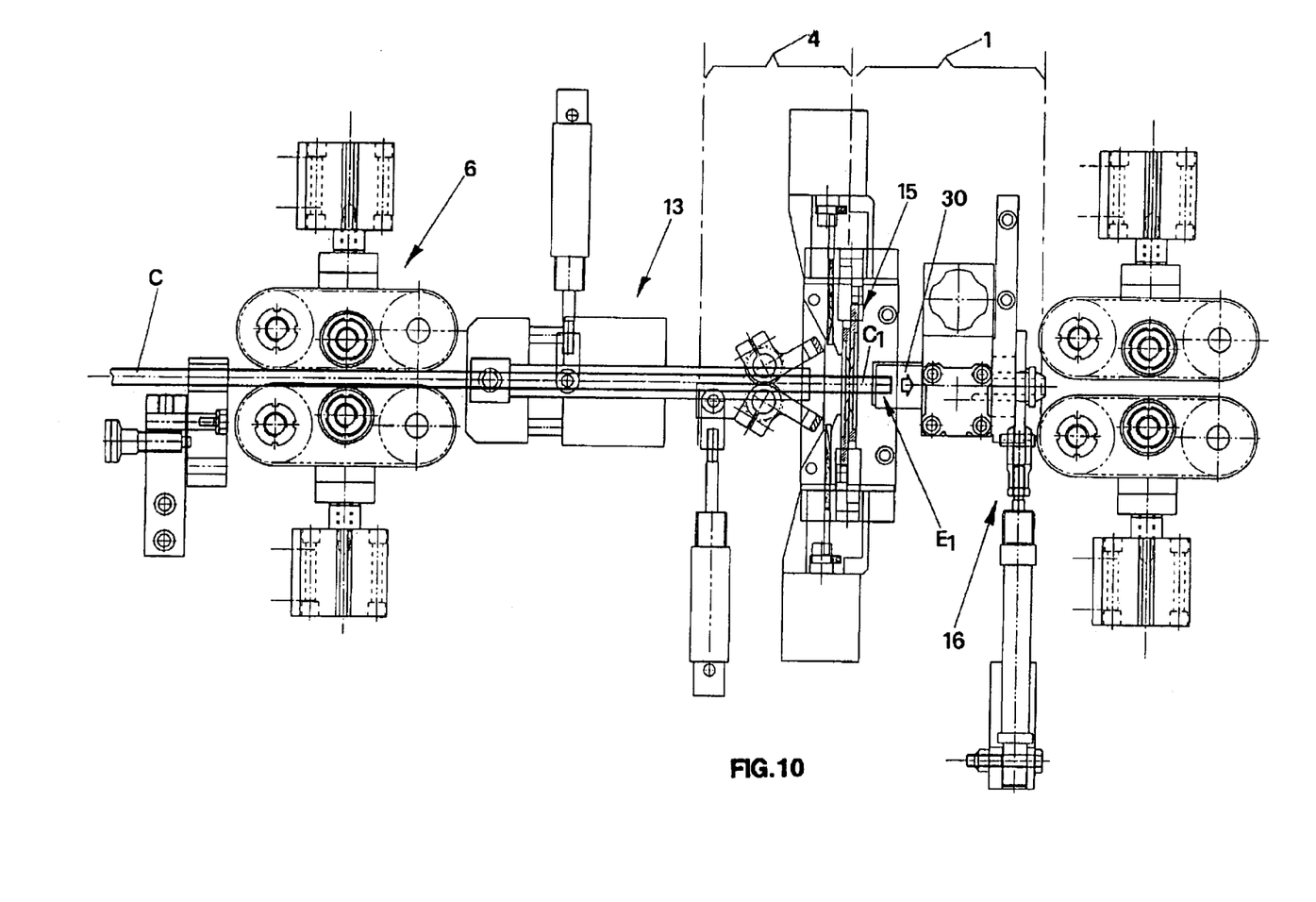
FIGS. 10 to 15 show different operative positions of the machine of FIG. 2.

For this purpose, first of all, it is necessary to introduce the cable C into the cable guide roller inlet 9 and then through the cable guide inlet 12 engaging the cable in the first driving unit 6 causing it to advance up to the position shown in FIG. 10.

In this position the front end E1 of the cable C is arranged in the stripping unit 1 inside the rotary chuck 30 where it is arranged between the jaws 33, 34.

At this point the stripping method provides for two different operative modes whether the cable is rigid so as to withstand rotation without twisting or is of soft material.

Figures 3, 4:
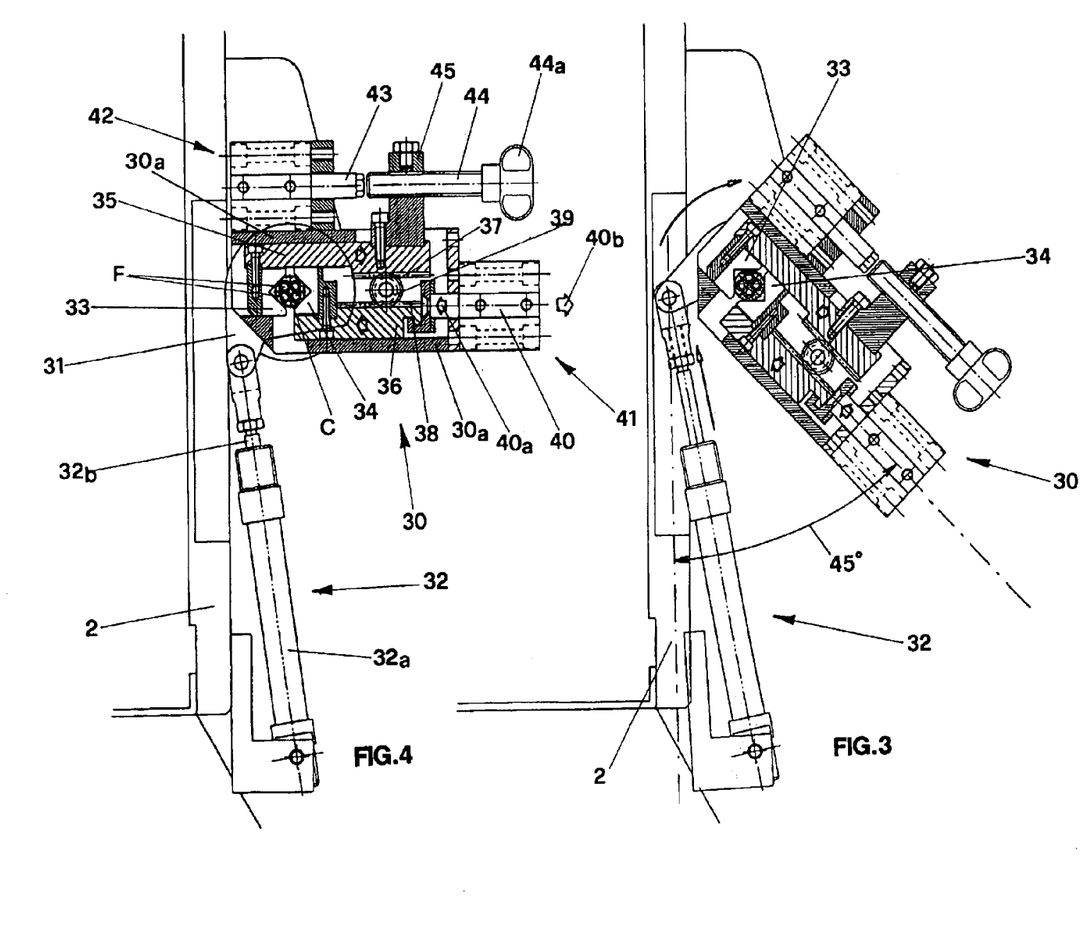
FIGS. 3 to 9 show details of the machine of FIG. 1.
Figure 3A:
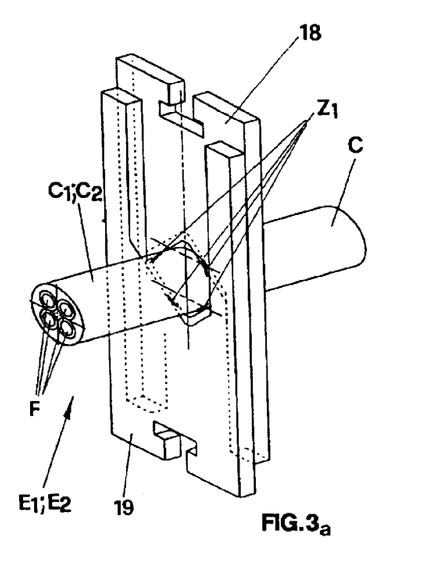
FIGS. 3a–3d show further details of the arrangement of FIG. 1.
Figure 3B:
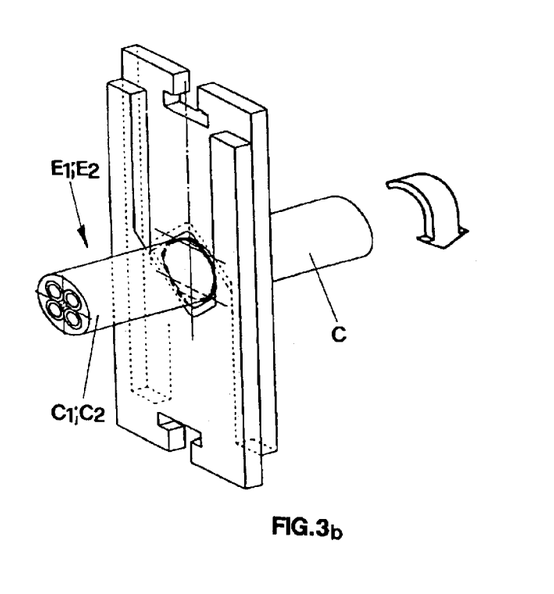
Figure 3C:
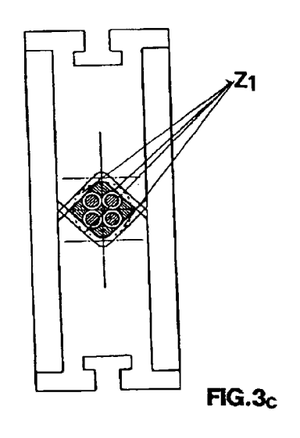
Figure 11:
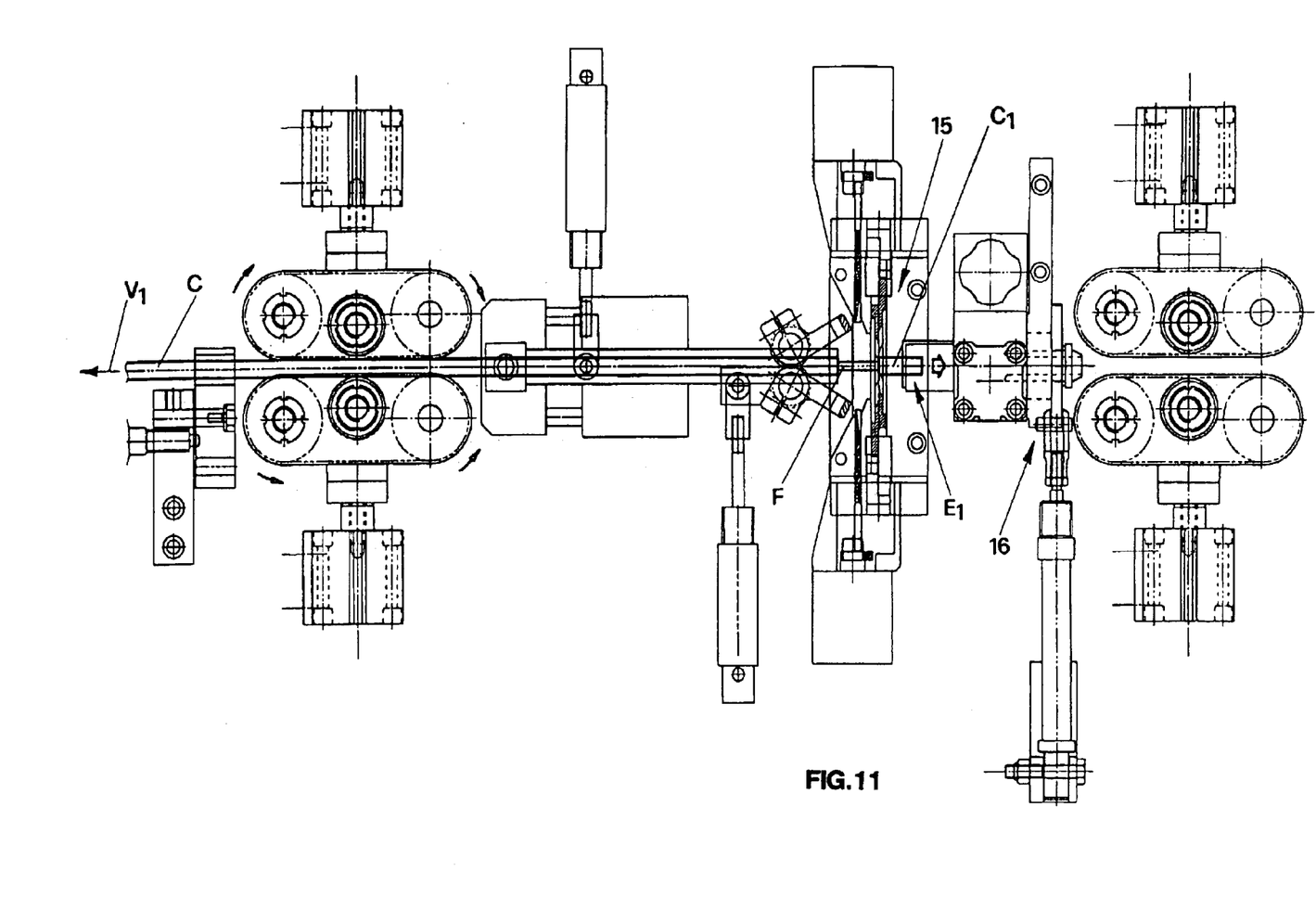

When the cable is of the rigid type, the stripping method provides for the following steps: clamping the end E1 of the cable C between the jaws 33, 34 of the rotary chuck 30 by actuating the first actuator 41; lowering the first blades 18, 19 until the sheath C1 of the cable C is incised at four zones Z1 opposite two-by-two indicated in FIGS. 3a and 3c; lifting the belts forming the first driving unit 6 so as to release the cable C upstream the end E1; actuating the actuator 32 so as to rotate the rotary chuck 30 from the position of FIG. 4 to that of FIG. 3 to cause through the first blades 18, 19 the circumferential incision of the sheath C1 shown in FIG. 3b; lowering again the belts of the driving unit 6 so as to clamp again the cable C; rotating the belts of the driving unit 6 in the directions indicated by arrows of FIG. 11 so as to move the cable C away from the stripping unit 1 along the direction indicated by the arrow V1 to allow unthreading of the section C1 of the cable sheath; actuating the actuator 32 to return the rotary chuck 30 in the configuration of FIG. 4; and opening the jaws 33, 34 as shown in FIG. 6 up to the maximum opening of FIG. 6a to allow the discharge by gravity of the sheath section C1.

As shown in FIG. 3, rotation of the rotary chuck 30 occurs for an angle preferably but not necessarily of 45 degrees which is sufficient to carry out cut of the sheath along its entire perimeter.

More particularly, in said FIGS. 6 and 6a one can see that the piloted movement of the rod 43 of the second actuator 42 in contrast against the previously adjusted screw 44, allows to adjust the opening degree of the jaws 33, 34 of the rotary chuck 30.

Figure 3D:
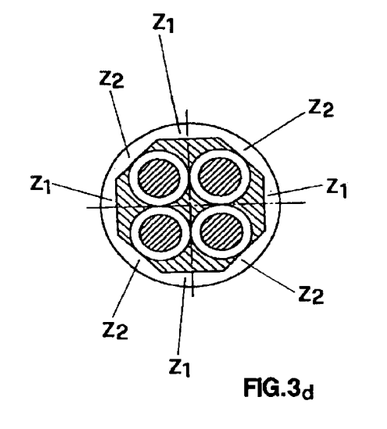
Figure 5:
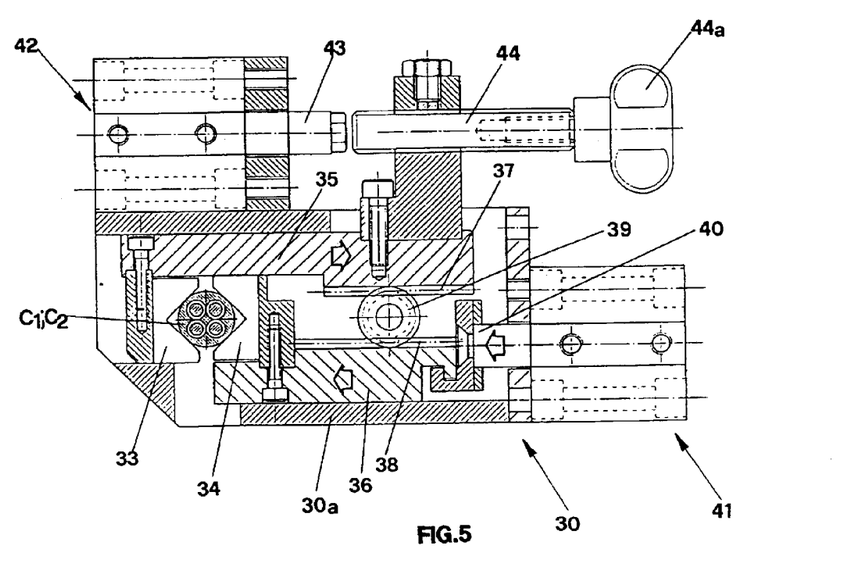

On the contrary, if the cable C is made of soft material and therefore hardly adapted to withstand a cutting action by rotation as subject to twisting, the method provides for the following steps: clamping the end E1 of the cable C between the jaws 33, 34 of the rotary chuck 30 by actuating the first actuator 41; lowering the first blades 18, 19 up to incision of the sheath C1 of the cable C at four zones Z1 opposite two-by-two indicated in FIGS. 3a and 3c; lifting the first blades 18, 19 from the contact with the sheath C1 and also the belts constituting the first driving unit 6 from the contact with cable C; rotating the end E1 of cable C through rotation of the rotary chuck 30 which is arranged in the configuration of FIG. 3; lowering again the first blades 18, 19 so as to incise the sheath C1 of cable C in four further zones Z2 obtaining a generally octagonal cut shown in FIG. 3d; lowering again the belts of the driving unit 6 so as to block again the cable C; rotating the belts of the driving unit 6 in the directions indicated by the arrows of FIG. 11 to move the cable C away from the stripping unit 1 along the direction indicated by arrow V1 and allow unthreading of the stretch C1 of the sheath of cable C; returning the rotary chuck 30 to the configuration of FIG. 4; and opening the jaws 33, 34 arranging them again in the final configuration shown in FIGS. 6a to allow discharge by gravity of the sheath C1.

With this second method twisting of the cable is avoided but separation of the sheath C1 occurs in an easy way just as in the preceding case in which the sheath is cut circumferentially. Indeed, the eight incisions Z1 and Z2 to be seen in FIG. 3d that are made in two subsequent moments by the blades 18, 19 circumferentially on the cable C, carry out cut of the sheath substantially along its entire periphery.

In order to avoid overlapping of the cutting zones Z1 and Z2 it is advisable that the rotary chuck 30 does not rotate for more that 45 degrees.

In order to strip also the rear end E2 of cable C, first of all it is necessary to shear to size the cable C obtaining a section of the desired length.

Figure 12:
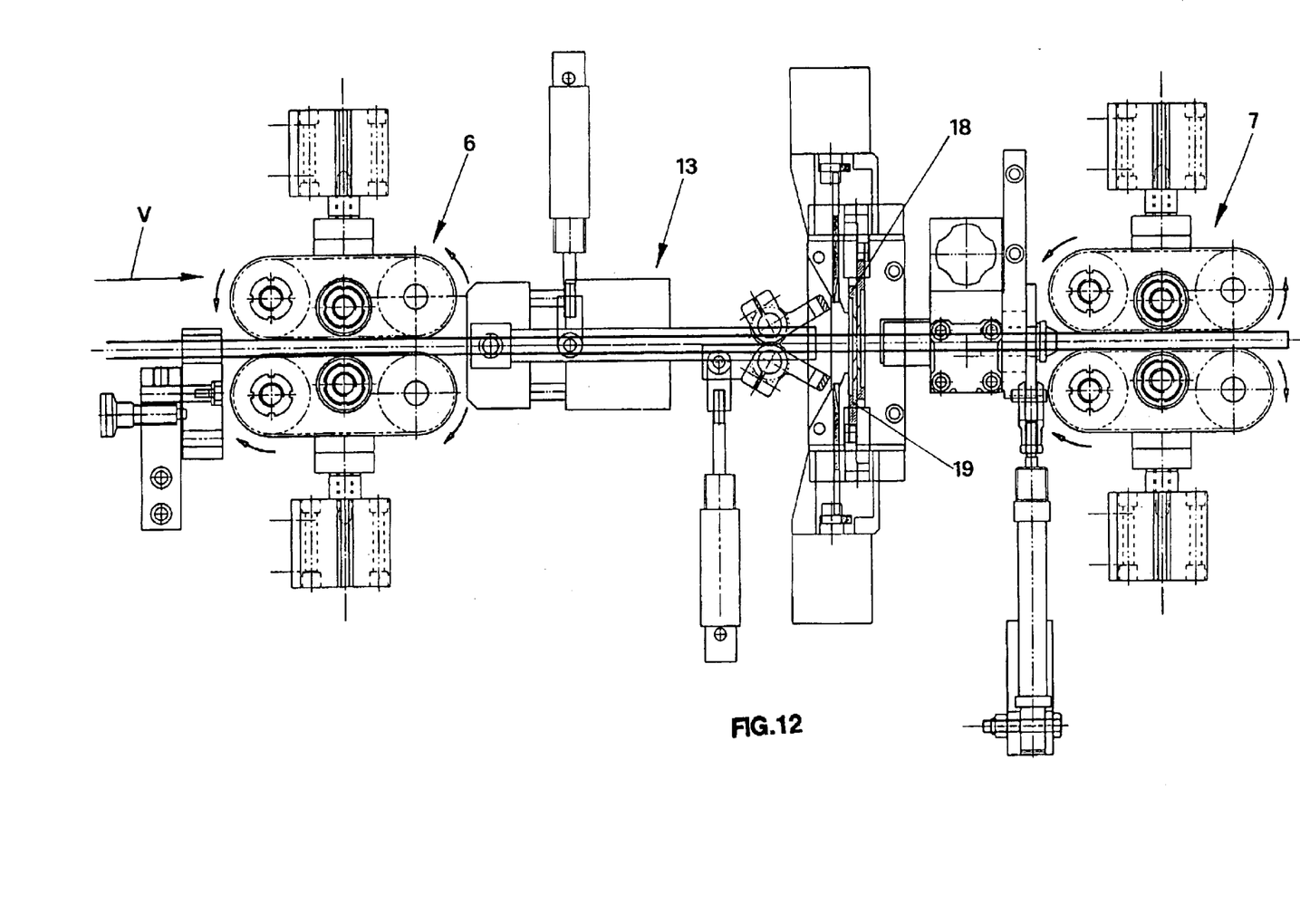

This is obtained as shown in FIG. 12, by advancing the cable C in the direction indicated by arrow V though the first driving unit 6 and the second driving unit 7 and then lowering the first blades 18, 19, the cable is shorn so as to obtain the section of the desired length.

Figure 13:
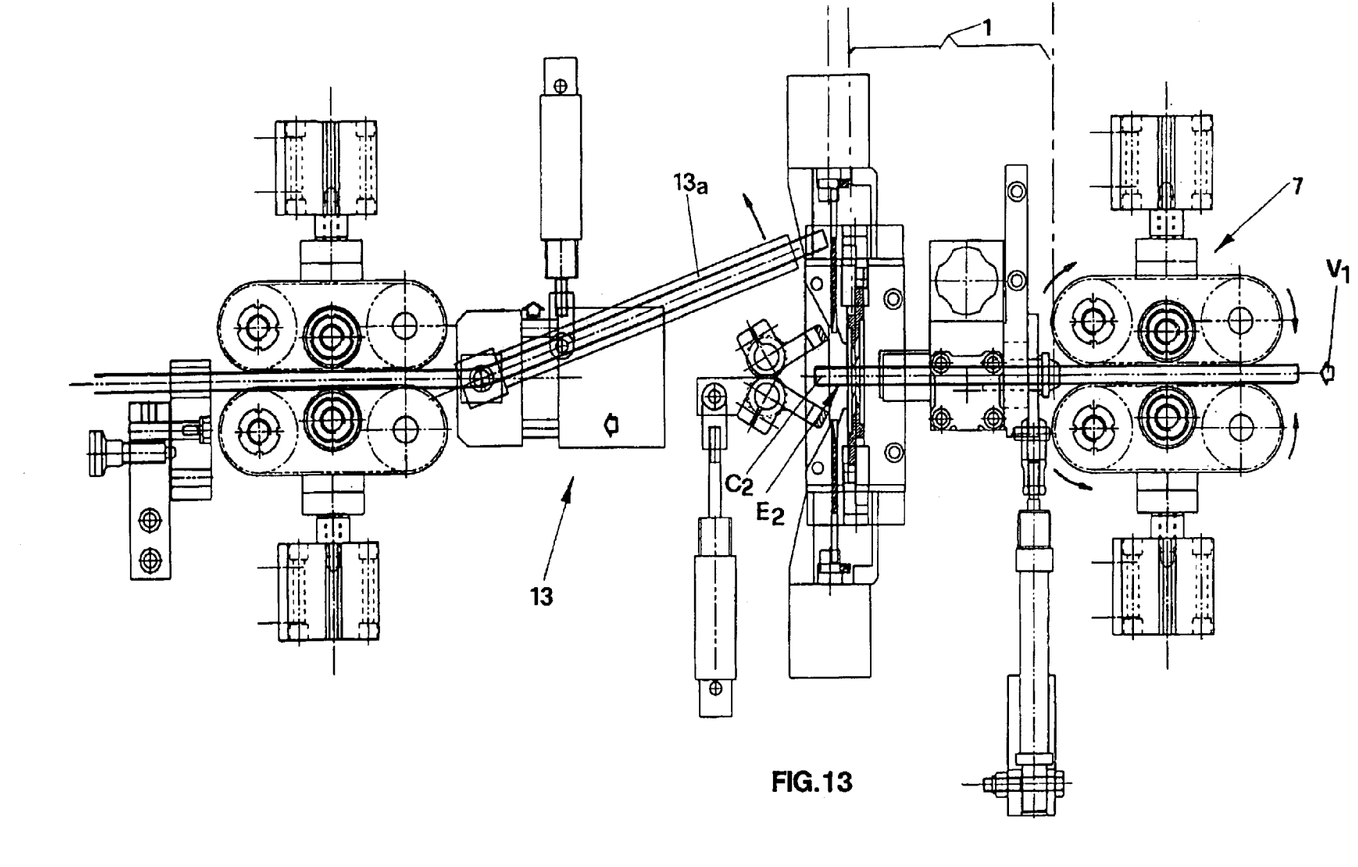

The section is then retracted through the second driving unit 7 in the direction of arrow V1 until it is arranged in the position shown in FIG. 13 with the rear end E2 in position in the stripping unit 1.

Before the section of the cable shorn to size is retracted in the direction of the arrow V1, by acting on the intermediate cable guide 13, the tubular member 13a is lifted so as to release the stripping zone of the rear end E2.

For the incision of the sheath section C2, one proceeds in either of the previously described two operative modes according to the nature of the cable, taking into account that the section of cable C according to the need, must be blocked or made free to rotate by either lifting or lowering the belts of the second driving unit 7.

Figure 14:
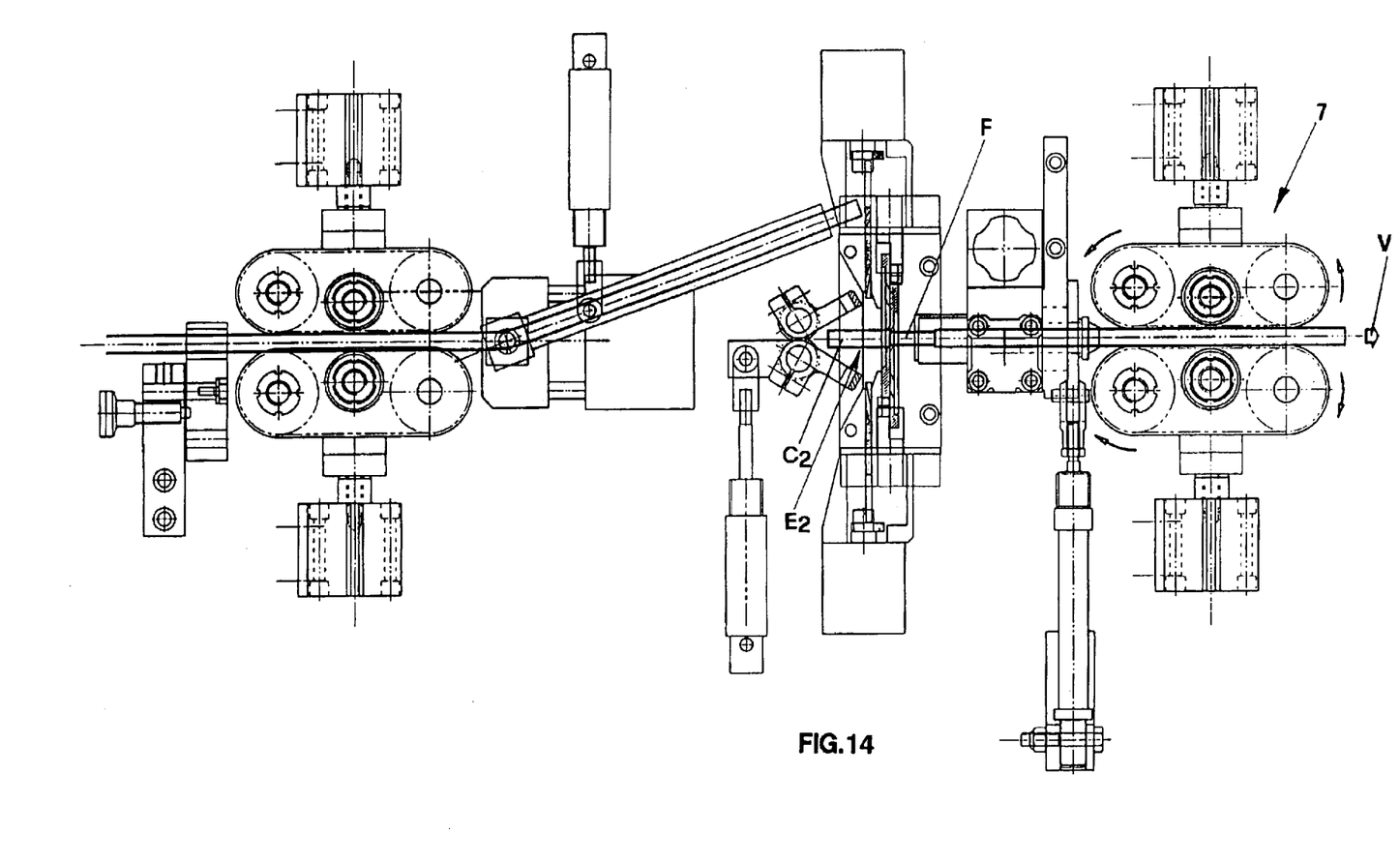

After having cut the sheath section C2, keeping the first blades 18, 19 lowered in the cut made in the sheath, the cable section is advanced again in the direction indicated by arrow V as shown in FIG. 14, so as to unthread the sheath section C2 from the cable C and releasing the wires F.

Therefore, these wires may in turn be stripped by intervention of the alignment and stripping unit 4 and more particularly of the second blades 64, 65 after alignment of the wires by closing the jaws 61, 62 of the alignment chuck 60 as shown in FIGS. 15 to 17.

Obviously, the described stripping method may start from stripping the rear end E2 of the section shorn to size and then proceed to stripping the front end E1.

In view of the foregoing one can understand that the method and the stripping unit of the invention attain the intended objects.

As already mentioned the stripping unit of the invention may constitute an autonomous stripping unit of the ends of sections already shorn to size or may be applied to a shearing-stripping machine of any kind available on the market.

Possible constructional versions that should be made to the stripping unit of the invention should be intended covered by the present patent when falling in the scope of the appended claims.

What is claimed is:

1. A method for stripping a sheath covering from the end of an electric cable comprising the steps of:
   arranging the end of the cable to stripped inside a stripping unit having an automatic cutter;
   arranging an automatic driving mechanism both upstream and downstream of the stripping unit; advancing the cable longitudinally within each driving mechanism;
   circumferentially cutting the sheath covering of said cable end with the cutter for at least a portion of the thickness and at least a portion of the perimeter of the sheath;
   separating the sheath covering from said cable end, wherein said circumferential cutting comprises rotating and incising the cable at the same time including the steps of:
      performing a first incision on the sheath, rotating the cable and performing a second incision of the sheath, wherein said first incision occurs first in time and said second incision occurs second in time and rotation of the cable occurs after said first incision begins and before the second incision is completed.

2. A stripping machine for stripping the sheath covering from the end of an electric cable having a longitudinal axis, said stripping machine for incising the sheath and rotating the cable comprising:
   a casing;
   a stripping unit on the casing;
   driving means for advancing the cable arranged upstream and downstream of said stripping unit;
   a control and actuation microprocessor unit for controlling the stripping machine, wherein said stripping unit includes a rotating unit and a cutting unit, said rotating unit for rotating the cable around the longitudinal axis and the cutting unit for incising the sheath covering before and after commencement and termination of cable rotation.

3. The stripping machine according to claim 2 wherein said rotation unit comprises a rotary chuck for blocking said end of said cable, said rotary chuck being arranged coaxially outside said cable and being coupled to driving means adapted to put it into rotation around said longitudinal axis defined by said cable.

4. The stripping machine according to claim 3 wherein said rotary chuck comprises a couple of opposite jaws between which said end of said cable to be blocked and rotated is arranged, said jaws being each fixed to a corresponding slide sliding inside the body of said rotary chuck, at least a first of said slides being associated to driving means adapted to mutually move said slides and at least a second of said slides being associated to means adjusting the opening of said jaws.

5. The stripping machine according to claim 4 wherein said driving means comprise: a couple of racks associated to said slides and facing each other; a pinion gear arranged between said rack and meshing therewith; a first actuator supported by the body of said rotary chuck, having a movable member fixed to a first of said slides adapted to move it along a rectilinear direction.

6. The stripping machine according to claim 4 wherein said means adjusting the opening of said jaws comprise a second actuator supported by the body of said rotary chuck having the movable member co-operating with a screw coupled in a nut screw fixed to said second of said slides.

7. The stripping machine according to claim 4 wherein each of said jaws has at least a profile in the form of a V shaped like a comb.

8. The stripping machine according to claim 2 wherein said cutting unit comprises at least a couple of first blades associated to driving and moving means adapted to put them in motion along opposed directions orthogonal to said longitudinal axis of said cable.

9. The stripping machine according to claim 8 wherein said first blades have opposite cutting edges in the form of a V.

10. The stripping machine according to claim 2 wherein it comprises an aligning and stripping unit for said wires constituting said cable, arranged upstream said stripping unit for said cable.

11. The stripping machine according to claim 4 wherein said rotary chuck makes a rotation of 45°.

12. The stripping machine according to claim 2 wherein said driving means comprises:
a first driving unit located upstream of said stripping unit for introducing said cable into said stripping unit, and
a second driving unit located downstream of said stripping unit for extracting said cable from said stripping unit.

13. The stripping machine according to claim 12 further comprising an intermediate cable guide comprising a tubular member for holding said cable located between said first driving unit and said stripping unit; and actuating means for translating and rotating said cable.

14. A stripping machine for stripping the sheath covering from the end of an electric cable having a longitudinal axis, said stripping machine for incising the sheath and rotating the cable comprising:
a casing;
a stripping unit on the casing;
driving means for advancing the cable arranged upstream and downstream of said stripping unit;
a control and actuation microprocessor unit for controlling the stripping machine, wherein said stripping unit includes a rotating unit and a cutting unit, said rotating unit for rotating the cable around the longitudinal axis and the cutting unit for incising the sheath covering before and after commencement and termination of cable rotation;
said stripping machine adapted to carry out a method comprising the steps of:
arranging the end of the cable to be stripped inside the stripping unit;
arranging the driving unit upstream and downstream of the stripping unit;
advancing the cable longitudinally in the driving unit;
circumferentially cutting the sheath covering of said cable end for at least a portion of the thickness and at least a portion of the perimeter of said sheath;
separating the sheath covering from said cable end, wherein said circumferential cutting comprises rotating and incising the cable at the same time including the steps of:
performing the first incision of the sheath, rotating the cable and performing the second incision of the sheath, wherein said first incision occurs first in time and said second incision occurs second in time and rotation of the cable occurs after said first incision begins and before the second incision is completed.

* * * * *